US008626380B2

(12) United States Patent  
Styles et al.

(10) Patent No.: US 8,626,380 B2  
(45) Date of Patent: Jan. 7, 2014

(54) CONTROL SYSTEMS

(75) Inventors: Julian Styles, Sawson (GB); Ian Thorpe, Cambridge (GB); Carl Pickering, Kenilworth (GB)

(73) Assignee: Jaguar Cars Limited (GB)

( * ) Notice: Subject to any disclaimer, the term of this patent is extended or adjusted under 35 U.S.C. 154(b) by 1024 days.

(21) Appl. No.: 11/079,658

(22) Filed: Mar. 14, 2005

(65) Prior Publication Data

US 2007/0265745 A1    Nov. 15, 2007

Related U.S. Application Data

(63) Continuation of application No. PCT/GB03/03798, filed on Sep. 2, 2003.

(30) Foreign Application Priority Data

Sep. 6, 2002  (GB) .................................. 0220712.4

(51) Int. Cl.
*G06F 19/00* (2011.01)
*B60N 3/00* (2006.01)

(52) U.S. Cl.
USPC ............... 701/36; 340/562; 341/173; 455/14; 455/84

(58) Field of Classification Search
USPC ................... 701/36; 345/7, 9, 173, 258, 658; 340/562, 660, 561, 534; 324/658; 180/167, 169; 341/173, 177; 455/74, 455/84, 418

See application file for complete search history.

(56) References Cited

U.S. PATENT DOCUMENTS

| 5,519,410 | A | * | 5/1996 | Smalanskas et al. ............. 345/7 |
| 5,539,429 | A | * | 7/1996 | Yano et al. ..................... 345/173 |
| 5,565,658 | A | * | 10/1996 | Gerpheide et al. ......... 178/18.02 |
| 5,621,457 | A | * | 4/1997 | Ishiwaka et al. ................ 348/78 |
| 5,673,041 | A | * | 9/1997 | Chatigny et al. ................ 341/22 |
| 5,715,319 | A | * | 2/1998 | Chu ................................ 381/26 |
| 5,784,036 | A | * | 7/1998 | Higuchi et al. .................... 345/7 |
| 6,009,355 | A | * | 12/1999 | Obradovich et al. ............. 701/1 |
| 6,032,089 | A | * | 2/2000 | Buckley .......................... 701/36 |
| 6,100,811 | A | * | 8/2000 | Hsu et al. .................... 340/5.83 |
| 6,697,721 | B2 | * | 2/2004 | Arlinsky ........................ 701/36 |

(Continued)

FOREIGN PATENT DOCUMENTS

DE    4301160 C2 *  7/1993
DE    4301160 A1     7/1994

(Continued)

OTHER PUBLICATIONS

EP Office Action dated 22/19/2007 for Appln. No. 03 793 868.5.

(Continued)

*Primary Examiner* — Ronnie Mancho
(74) *Attorney, Agent, or Firm* — Brooks Kushman P.C.

(57) ABSTRACT

A control system for a vehicle subsystem (10) comprises a controller (12) arranged to control operation of the subsystem (10), a user input (16) connected to the system controller (12) and arranged to be operated by a user, and a sensor comprising a transmitter (22) associated with user input (16) and a receiver (26) associated with a first user, whereby the controller uses detection of a signal from the transmitter (22) by the receiver (26) to distinguish between operation of the user input (16) by said first user and operation of the user input by a second user.

18 Claims, 7 Drawing Sheets

(56) References Cited

U.S. PATENT DOCUMENTS

| | | | |
|---|---|---|---|
| 7,053,866 B1 * | 5/2006 | Mimran | 345/8 |
| 7,057,521 B1 * | 6/2006 | Beuk et al. | 340/825.56 |
| 7,126,583 B1 * | 10/2006 | Breed | 345/158 |
| 7,545,270 B2 * | 6/2009 | Pickering et al. | 340/561 |

FOREIGN PATENT DOCUMENTS

| | | |
|---|---|---|
| DE | 4301160 C2 | 7/1994 |
| EP | 0846822 A2 | 6/1998 |
| WO | 2004022388 A1 | 3/2004 |

OTHER PUBLICATIONS

English Translation of DE 43 01 160 C2.
English Translation of EP 0 846 822 A2.
European Office Action for corresponding European Application No. 03 793 868.5, mailed Nov. 19, 2007, 5 pages.
European Office Action for corresponding European Application No. 03 793 868.5, mailed Feb. 13, 2009, 3 pages.
EP Office Action dated Feb. 13, 2009 for Appln. No. 03 793 868.5.
EP Office Action dated 22-19-2007 for Appln. No. 03 793 868.5.
International Search Report mailed Feb. 12, 2003.
English Translation of DE 43 01 160 C2, Dated Jul. 21, 1994.
English Translation of EP 0 846 822 A2, Dated Jun. 10, 1998.

* cited by examiner

CONTROL SYSTEMS

CROSS-REFERENCE TO RELATED APPLICATIONS

This application claims the benefit of PCT Application PCT/GB2003/003798, filed Sep. 2, 2003, which in turn claims the benefit of GB Application 0220712.4, filed Jun. 9, 2002.

This invention relates to the control of vehicle sub-systems, and in particular to the identification of a user who is operating such vehicle sub-systems.

It is known to provide a vehicle with a user-operated control for operating one or more subsystems of the vehicle, such as for example a manually rotated knob for adjusting the output temperature of a heating and ventilating system. It is also known, for example from U.S. Pat. No. 5,923,267 and U.S. Pat. No. 5,784,036 to provide sensor arrangements which can detect when an operator's hand is approaching or touching a control and respond by providing information to the operator, for example as a head-up display on a vehicle windscreen or as an audible signal.

According to the invention, there is provided a control system for a vehicle subsystem, the control system comprising a controller arranged to control operation of the subsystem, a user input connected to the controller and arranged to be operated by a first user and a second user, and a sensor comprising a transmitter and a receiver, one of the transmitter and the receiver being associated with the user input and one of the transmitter and the receiver being adapted to be associated with the first user whereby the controller can use detection of a signal from the transmitter by the receiver to distinguish between operation of the user input by said first user and operation of the user input by the second user, characterised in that the subsystem includes a display arranged to display information to a user, and the controller is arranged to operate the display in a manner determined by which user operates the user input. For example the display may be controlled to display the information only if one of the users operates the user input. Alternatively the position in which the information is displayed may depend on which user operates the user input.

The signal is preferably varied at a frequency of from 10 to 200 kHz. These frequencies have been found to work in the type of systems described above. More preferably the frequency of variation is from 50 to 100 kHz. The voltage of the signal is preferably from 1 to 15V.

Preferably the controller is arranged to transmit a signal via the transmitter, and to receive the signal via the receiver.

Preferably one of the transmitter and the receiver is in a position arranged to be associated with the first user. For example said one of the transmitter and the receiver may be arranged to be mounted in a seat of the vehicle such that the first user is a person sitting on the seat. Alternatively it can be mounted elsewhere, such as in a footwell of the passenger compartment of the vehicle where it will be significantly nearer to one user than another.

The driver input may comprise a movable input member and one of the transmitter and receiver may be mounted in the input member. Alternatively one of the transmitter and receiver may be mounted adjacent to the driver input. For example where the driver input is provided in a panel, one of the transmitter and receiver may be mounted so that it extends at least partially around the panel. Alternatively, if the driver input includes a screen, one of the transmitter and receiver may comprise a conductive layer forming part of the screen.

The controller may be arranged to control the subsystem in a manner determined by which user operates the user input. For example, the controller may be arranged to respond to inputs from one of the users but not to inputs from the other of the users.

The display may be a head-up display arranged to project a display image onto a windscreen of the vehicle.

Preferably the control system further comprises an indicator and the controller may be arranged to operate the indicator to indicate which user is operating the system. The indicator may comprise an illuminator associated with the user input, and the controller be arranged to control the illuminator in a manner which is dependent on which user is operating the system. For example the intensity, pattern, colour or another property of illumination of the user input may be variable dependent upon which user is operating the system.

Preferably the transmitter and the receiver are arranged to define first and second signal paths each associated with a respective one of the users, and the controller is arranged to measure the strengths of the signals transmitted through the first and second signal paths thereby to determine which of the users operates the user input.

The transmitter may comprise first and second transmitters each associated with a respective one of the users. In this case the controller may be arranged to transmit separate signals through the two transmitters and to identify which signal is received by the receiver thereby to determine which user operates the user input. The separate signals may be transmitted at different times, or may have different formats, for example being pulsed or coded in different ways.

The receiver may comprise first and second receivers each associated with a respective one of the users. In this case the controller is preferably arranged to measure the strength of the signals received by the two receivers thereby to determine which user operates the user input.

Preferably at least one condition is defined which must be met for the subsystem to respond to inputs from one of the users, but which does not need to be met for the system to respond to inputs from the other of the users. For example if the driver is detected as operating the input then the system may be arranged not to respond unless the vehicle is stationary.

The invention will now be described by way of example only and with reference to the accompanying drawings, in which.

Figure 1:
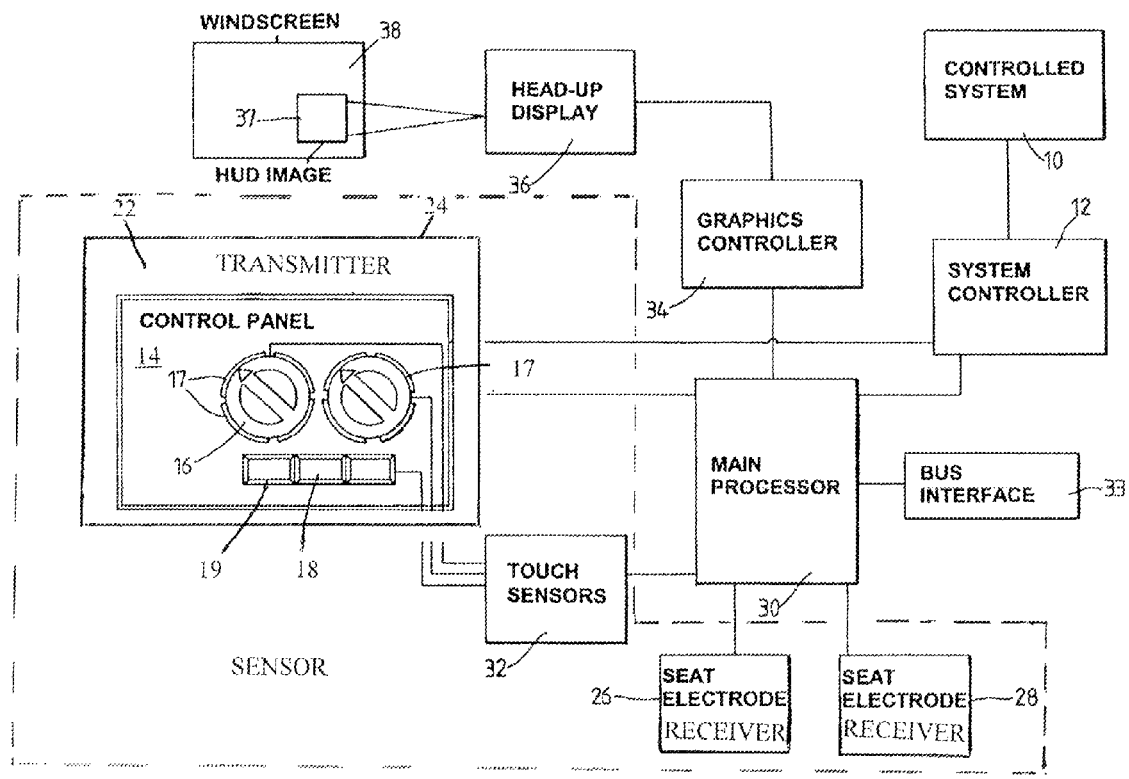
FIG. 1 is a schematic system diagram of a control system according to a first embodiment of the invention.
Figure 2:
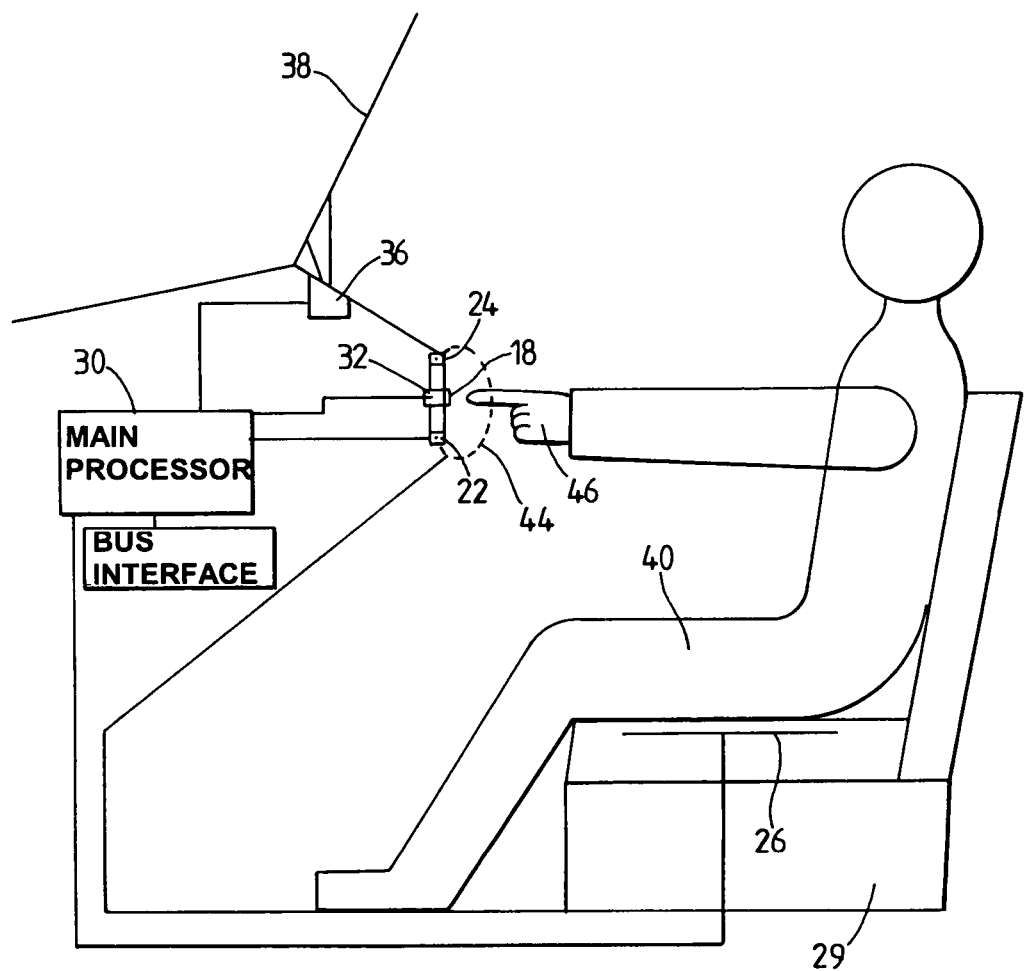
FIG. 2 is a schematic side view of the system of FIG. 1 incorporated in a vehicle.
Figure 3:
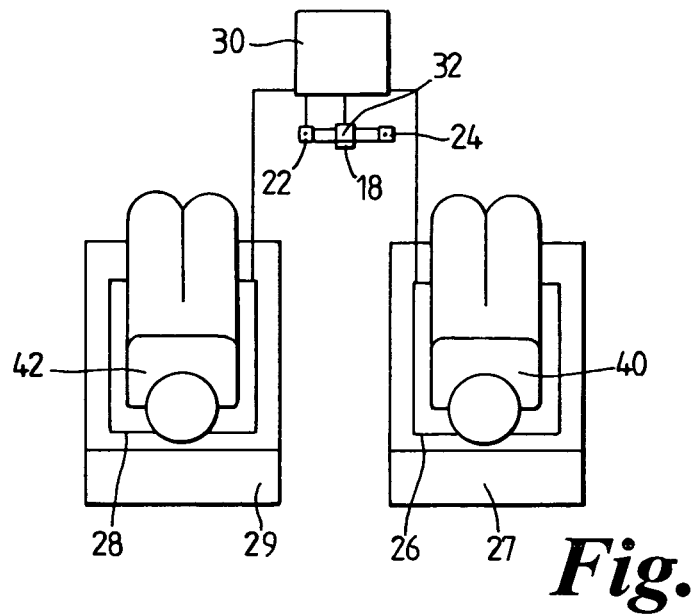
FIG. 3 is a schematic plan view of the system of FIG. 1 incorporated in a vehicle.

Referring to FIGS. 1 to 3, a control system for a vehicle subsystem 10, which in this particular embodiment is a heating and ventilating system, comprises a system controller 12 arranged to control operation of the subsystem 10, and a control panel 14, which includes a plurality of user input elements in the form of rotary controls 16 and push button controls 18. The controls 16, 18 are used to control the operation of the subsystem 10, and the system controller 12 receives input signals from the controls 16, 18. A number of LEDs 17 are arranged around each of the rotary controls 16, and a further LED 19 is provided around each of the push button controls 18. A control electrode 22 in the form of a wire is provided in a bezel 24 around the control panel 14, and a pair of seat electrodes 26, 28 in the form of conductive foil sheets are provided, one in each of the driver's seat 27 and front passenger seat 29 of the vehicle. The electrodes 22, 26, 28 are all connected to a main processor or CPU 30 which is arranged to transmit electrical signals through the control electrode 22 and receive them through the seat electrodes 26, 26 as will be described in more detail below. The CPU 30 also controls operation of the LEDs 17, 19 which illuminate the controls 16, 18. Touch sensors 32 are also provided in each of the controls 16, 18 and are connected to the CPU 30 so that it can detect contact between a user's hand and any of the controls 16, 18.

The CPU 30 is also connected to a graphics controller 34 which in turn is connected to a head-up display unit 36 mounted beneath the vehicle windscreen 38 and arranged to project a display onto the windscreen so that it can be viewed by the driver 40 from the driver's seat 27. The CPU 30 is also connected to a bus interface 33 so that it can use data available on the vehicle CAN bus.

In use, the CPU 30 applies a sinusoidal signal of frequency 75 kHz and amplitude 5VV to the control electrode 22, and monitors the signals received from each of the seat electrodes 26, 28 at that frequency. While neither the driver 40 nor the passenger 42 are operating the controls 16, 18, provided no part of their body is within a predetermined region 44 close to the control panel 14, then no signal will be detected from either of the seat electrodes 26, 28. Under these conditions the head-up display unit 36 is not operated and the controlled system 10 is not altered.

If the driver 40 brings his hand 46 into the region 44 then the signal from the control electrode 22 will be transmitted through his body to the driver's seat electrode 26 where it will be received sufficiently strongly to be detected by the CPU 30. This is because the body of the driver 40 has different dielectric properties from the surrounding air and is better able to transmit the signal from the control electrode to the driver's seat electrode 26. The body of the driver 40 therefore provides a signal path through which the signal travels from the control electrode 22 to the seat electrode 26. When the signal is received by the driver's seat electrode 26, the CPU 30 activates the head-up display unit 36 which projects onto the windscreen a HUD image 37 representing the current positions of the controls 16, 18. When the driver's hand touches one of the controls 16, 18, for example one of the rotary controls 16, the contact switch 32 associated with that control 16 detects this contact and the CPU modifies the image 37 to indicate to the driver 40 which of the controls 16 his hand is touching, in this case by highlighting the representation of that control. As the driver moves the rotary control 16 the head-up display unit 36 alters the HUD image 37 to indicate to the driver the changing position of the control 16 so that he can determine what inputs he is making to the system controller 12. When the driver 40 has altered the controls to the desired setting, he withdraws his hand. When his hand leaves the region 44, the driver's seat electrode 26 ceases to receive the signal from the control electrode 22, and the CPU 30 detects the removal of the driver's hand. It then de-activates the head-up display unit 36.

If the passenger 42 brings his hand into the region 44, then the signal from the control electrode 22 is transmitted through a different signal path defined by the body of the passenger to the passenger's seat electrode 28. This is detected by the CPU which thereby recognizes that the passenger is about to operate the controls 16, 18. Since the passenger does not need to watch the road as the driver does, he does not need the head-up display as he can look at the controls 16, 18 while he operates them. Therefore, to avoid distraction of the driver, the head-up display 36 is not activated, but instead the LEDs 17, 19 are illuminated to aid the passenger in finding the controls 16, 18, and the system controller 12 responds to the passenger's inputs in the normal way. The LEDs 17, 19 are not lit up when the driver brings his hand near the controls 16, 18 so that they do not distract him away from the head-up display.

It will be appreciated that the LEDs 17, 19, or other illuminating means associated with the controls 16, 18, can be controlled in a number of other ways to distinguish between use by the driver and passenger. For example a pattern of illumination may be provided such that when a hand of one of the users enters the region near the controls, the controls become illuminated in a particular pattern, which is dependent on which user's hand is detected. This can be achieved by illuminating the controls 16, 18 in one sequence for the driver and another sequence for the passenger. Alternatively the LEDs 17, 19 may flash at a first predetermined rate for the driver and at a second predetermined rate for the passenger. LEDs of different colours can also be provided so that the controls can be illuminated in different colours for the driver and the passenger.

It will be appreciated that, with the ability to distinguish between the driver and the passenger, the manner in which the head-up display and the controlled system respond to operation of the controls can be varied in a number of ways. For example the system controller 12 can be arranged so as only to respond to inputs from the controls 16, 18 when the CPU detects that the driver is operating them. If the passenger is operating them, then the CPU sends a signal to the system controller 12 indicating this, and the system controller 12 does not respond. This might be advantageous for safety reasons to ensure that the driver's operation of the vehicle is not interfered with. Alternatively the position or the nature of the head-up display can be made dependent on which user operates the controls 16, 18. For example, when the driver 40 is detected as operating the controls then the head-up display can be provided on a part of the windscreen which is within the driver's view as he looks ahead so that he can watch the road ahead and see the display at the same time. However, when the passenger 42 operates the controls 16, 18, the head-up display can be provided in a different position within the passenger's view and to the edge of, or outside, the driver's view, so as not to distract the driver. In a further alternative the way the system responds can be made dependent on who is operating the controls. For example where the vehicle can provide separate heating or ventilation to the driver and the passenger, a single set of inputs can be used by both driver and passenger, and the system respond to inputs from each of them by changing the heating and ventilation provided to the appropriate side of the vehicle. In this way, the number of switches required is reduced thus saving space on the control panel 14. Similarly if a touch screen user input is used, the number of graphics relating to a particular control e.g. seat adjustment can be reduced to a single graphic which is able to discriminate between different users operating the system instead of having a separate graphic for each user.

It will also be appreciated that displays other than head-up displays can also form part of the system and be controlled in a manner which depends on which user is operating the user input. For example in an in-car entertainment system which includes a message centre for indicating the operation of the system visually using text or images, and which includes the ability to communicate information audibly, the system can be controlled so as to provide a visual output if the passenger is identified as operating the system, but to produce an audible output if the driver is identified as using the system. This ensures that use of the system by the passenger will not distract the driver, but the driver can operate the system without needing to look at the visual display.

Figure 4:
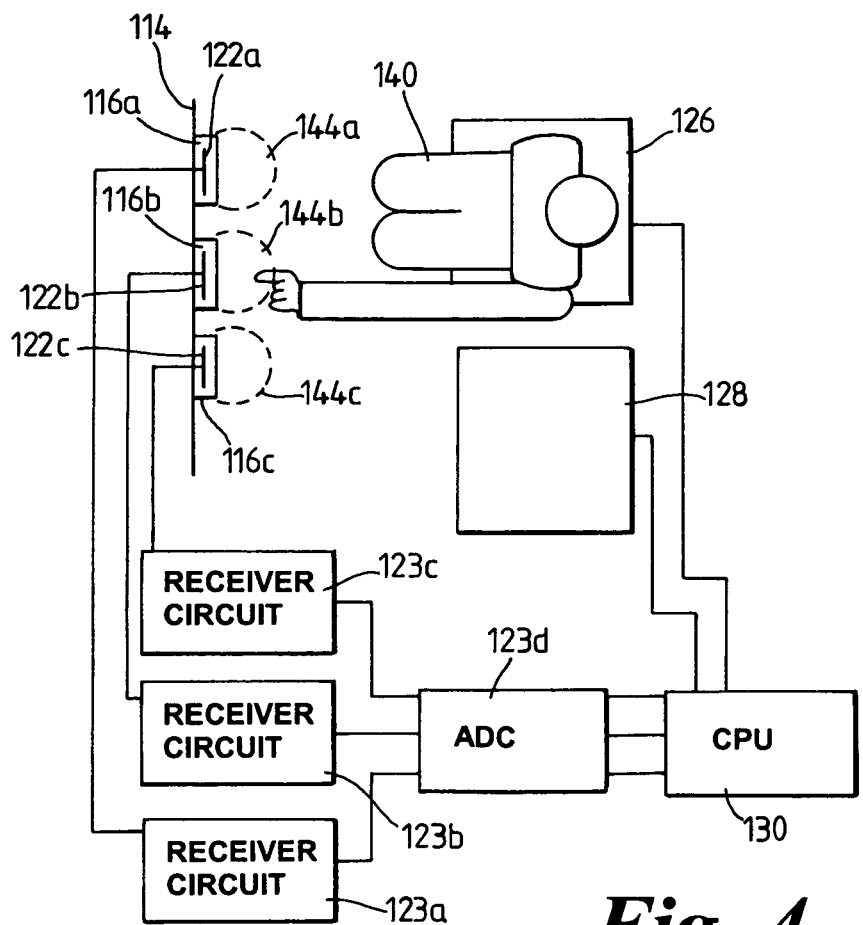
FIG. 4 is a schematic system diagram of a control system according to a second embodiment of the invention.

Referring to FIG. 4, in a second embodiment of the invention components which correspond to those in the first embodiment are indicated by the same reference numerals increased by 100. The control panel 114 has three rotary controls 116a, 116b, 116c and each of these has mounted in it a respective receiver electrode 122a, 122b, 122c each of which is connected via a receiver circuit 123a, 123b, 123c and an analogue to digital converter (ADC) 123d to the CPU 130. The two seat electrodes 126, 128 are connected to the CPU and arranged to act as transmitters.

In use, the CPU is arranged to transmit through the seat electrodes 126, 128 a sinusoidal signal of frequency 75 kHz and peak to peak amplitude of 5V. The signal is applied alternately to the two electrodes so that it is transmitted alternately from them. The frequency of alternation between the electrodes 126, 128 is set in this case to 30 Hz. The receiver circuits are tuned to the 100 kHz frequency of the transmitted signal and each produce a DC signal which varies with the strength of the signal detected by the respective receiver electrode 122a, 122b, 122c. Each of these signals is converted to a digital signal by the ADC 123d and then input at a respective input to the CPU 130. The CPU can therefore measure the strength of the signal received from each of the electrodes 122a, 122b, 122c, and by the timing of the received signals, based on the timing of the transmission via the two seat electrodes 126, 126, it can also determine from which seat electrodes the signal originated, and therefore whether the signal is transmitted through the driver 140 or the passenger.

Figure 5:
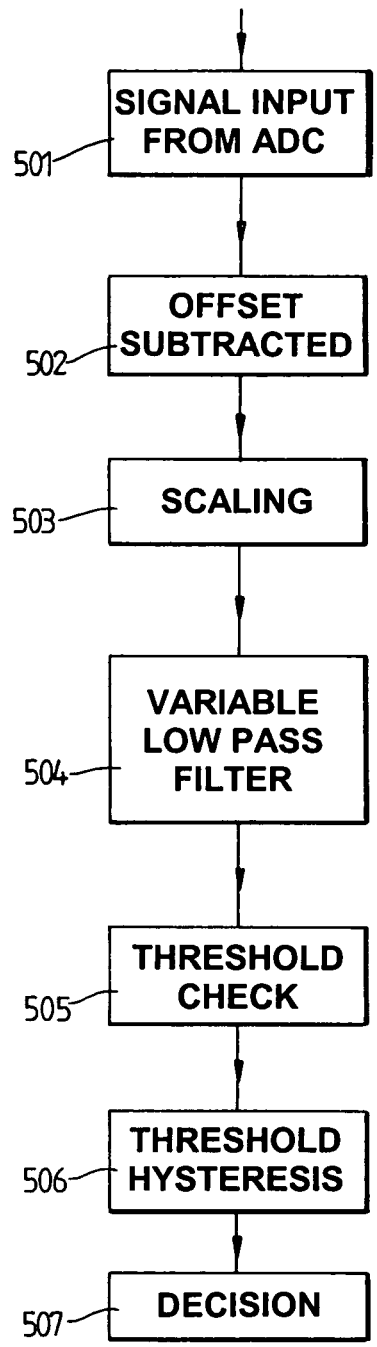
FIG. 5 is a flow diagram showing signal processing in the system of FIG. 4.

Referring to FIG. 5, each of the signals received from the ADC 123d is processed in software in the CPU to provide an accurate measure of the level of each signal. Each signal is input at step 501, and an offset subtracted from it at step 502. At step 503 a scaling factor is applied. At step 504 the signal is filtered using a variable low pass filter. In the filtering step the degree of low pass filtering is arranged to reduce as the rate of change of the signal level increases. This reduces noise in the steady state signal, but does not affect large rapid changes in signal amplitude caused, for example, by contact between the driver or passenger's hand and one of the controls 116a, 116b, 116c. At step 505 the level of the signal is checked against two thresholds, one corresponding to the driver or passenger's hand coming within a region 144a, 144b, 144c close to the respective control 116a, 116b, 116c, and another corresponding to the hand touching the control 116a, 116b, 116c. As the electrodes 122a, 122b, 122c, 126, 128 act as capacitive sensors, and the human body is significantly more effective at transmitting the signals than is air, contact between the hand and the control 116a, 116b, 116c produces a rapid increase in received signal strength. This can be detected by the CPU which enables the single electrode for each control 116a, 116b, 116c to act as both proximity sensor and contact sensor. At step 506 hysteresis is applied to the threshold detection so as to reduce the possibility of 'jitter' resulting from a rapid oscillation of the signal across either threshold. Finally at step 507 the decision is made, for each of the controls 116a, 116b, 116c, based on the threshold check, whether either the driver or the passenger is operating or about to operate the controls, and whether their hand is actually in contact with one of the controls or only within its associated region 144.

When the decision has been made as to whether any of the controls 116a, 116b, 166d is being operated, and by which user, the system responds in a suitable manner as described above in relation to the first embodiment.

Figure 6:
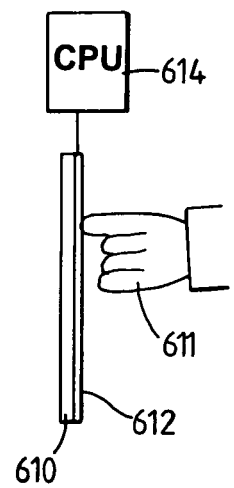
FIG. 6 is schematic section through a touch-screen control forming part of a third embodiment of the invention.

Referring to FIG. 6, in a third embodiment of the invention the user input takes the form of a touch sensitive screen 610. Such screens are well known and have areas defined on them which, when touched by a user's hand 611, determine how the controlled system is controlled. A layer of conductive material 612 is provided over the screen 610 and acts as the control electrode, being connected to the CPU 614. The electrode 612 can be a transmitting or receiving electrode and be used in the same manner as the control electrodes of the first and second embodiments. In this embodiment the conductive layer 612 is provided specifically to act as an electrode. However in some touch sensitive screens such a conductive layer is already present for operation of the touch sensing function of the screen, and this layer can be used also as the electrode. Depending upon which user is operating the system, and on other factors such as whether the vehicle is moving or not, different user input graphics (not shown) may be provided on the screen 610. For example the driver may be allowed to operate only a limited range of inputs when the vehicle is moving, but have access to all inputs when the vehicle is stationary. A passenger may have exclusive access to navigation destination data entry, SMS, phone book lists, internet and television when the vehicle is moving since the driver should not be allowed to access these for safety reasons.

Figure 7:
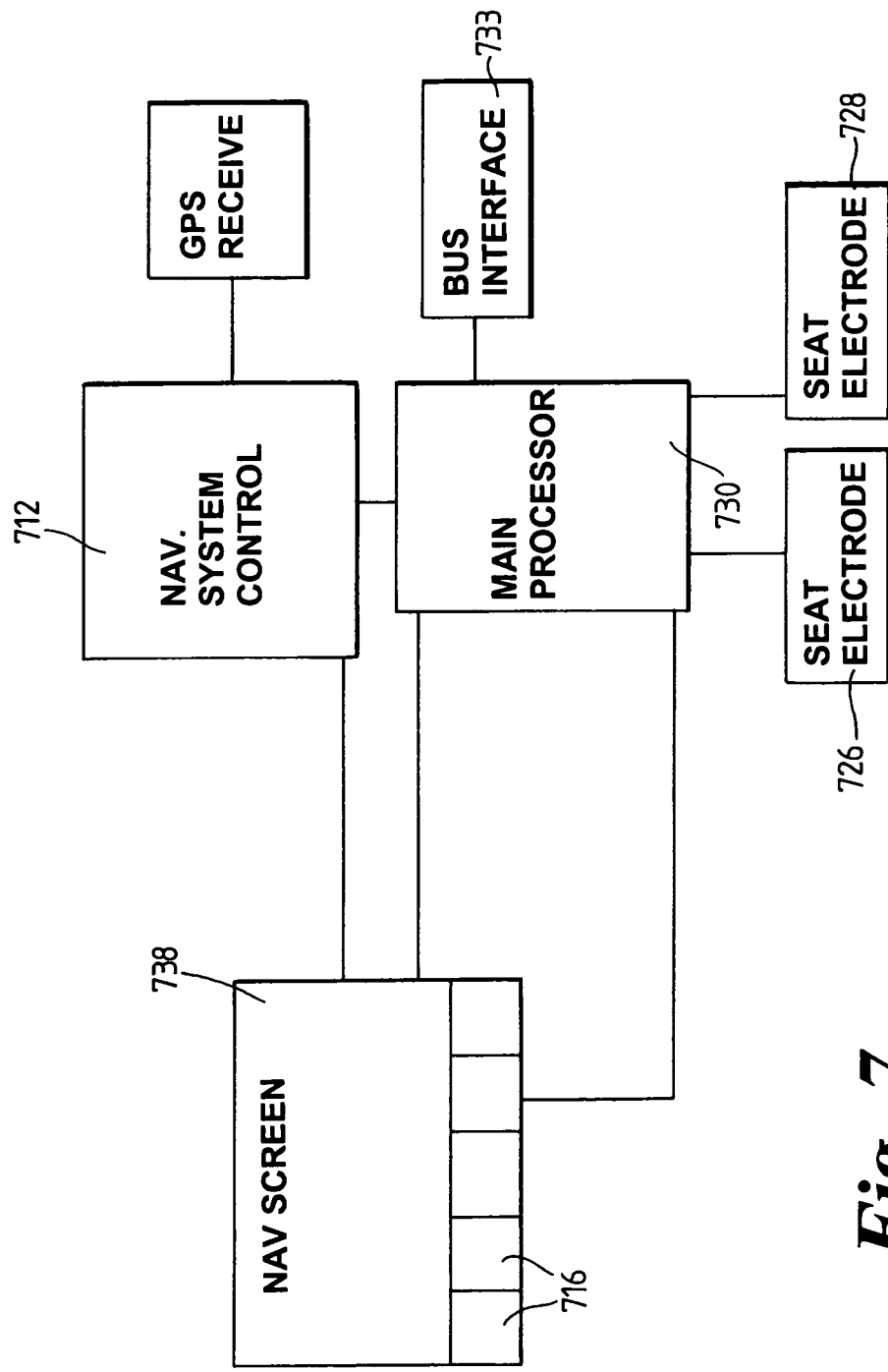
FIG. 7 is a schematic system diagram of a control system according to a fourth embodiment of the invention.

Referring to FIG. 7, in a fourth embodiment of the invention CPU 730, which is connected to two seat electrodes 726, 728 as in the first embodiment, is also connected to control the screen 738 of a satellite navigation system. That system also comprises a control unit 712 which is also connected to the CPU and to a GPS receiver. The navigation system control system control unit 712 controls the screen 738 in a conventional manner, in response to inputs from a user made by touching areas 716 on the screen 738. However the CPU 730 is arranged to transmit user identification signals through each of the seat electrodes 726, 728 and receive them through a screen electrode comprising a conductive layer in the screen 738 so as to identify whether the driver or passenger is operating the touch screen.

If the passenger is operating the touch screen then the CPU indicates this to the navigation control system 712 which responds in a normal way to the user inputs. If the driver is operating the touch screen, then the main processor checks the speed of the vehicle using the vehicle speed signal on the CAN bus which it accesses through the bus interface 733. The vehicle speed signal is provided, for example, by an antilock brake system of the vehicle. If the vehicle speed is zero then it is judged to be safe for the driver to operate the navigation system, which responds to the user inputs. However, if the vehicle speed is greater than zero indicating that the vehicle is moving, then the CPU sends a signal to the navigation system control unit 712 which does not respond to the user inputs. This discourages the driver from trying to operate the navigation system while he is driving the vehicle. Alternatively the CPU may respond to some of the driver operated user inputs when the vehicle is moving, but not others i.e. the CPU may not respond to user inputs which are complex to operate and require significant attention from the driver.

If for any reason both the driver and the passenger are both detected as touching the screen, then the navigation system still does not respond. This is to ensure that the lock-out of the system cannot easily be overcome, for example by a passenger who does not know how to operate the navigation system simply touching the screen to enable the driver to operate it.

Figure 8:
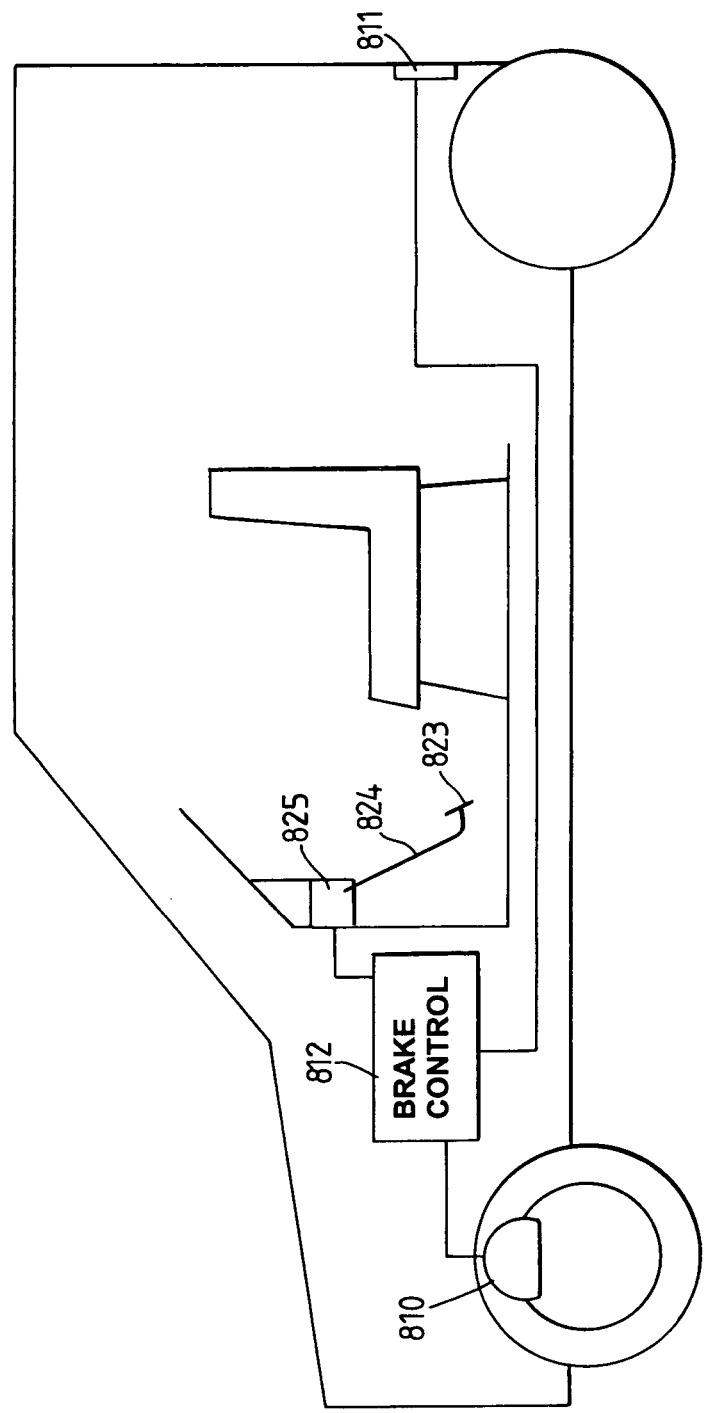
FIG. 8 shows a vehicle including a control system according to a fifth embodiment of the invention.
Figure 9:
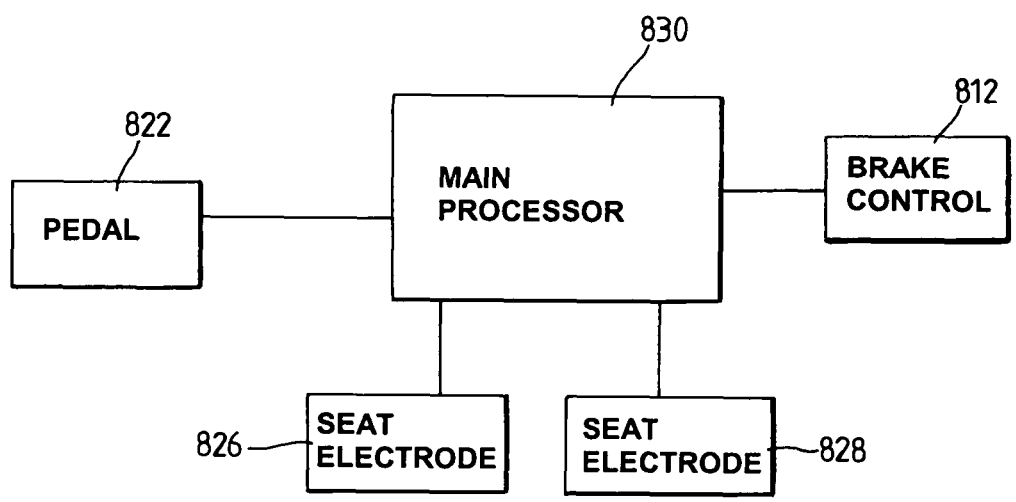
FIG. 9 is a schematic system diagram of the system of FIG. 8.

Referring to FIGS. 8 and 9, in a fifth embodiment of the invention, the CPU 830 is connected to two seat electrodes 826, 828 which act as the transmitting electrodes, and a pedal electrode 822 which is mounted in the foot pad 823 of a brake pedal 824. A pedal position sensor measures the position of the brake pedal 824 and sends a signal to the control unit 812 for the vehicle brake system. The CPU 830 is arranged to detect when the driver's foot is within a predetermined distance of the pedal 824 and in response to activate the brake lights 811 of the vehicle. The brake control unit also responds to depression of the brake pedal 824 by actuating the vehicle brakes 810. If any other object, which is either positively identified as the passenger's foot or is not recognized at all by the system is brought within the predetermined distance of the brake pedal, then the brake lights 811 are not activated as it is assumed that the brakes are not about to be actuated.

In this embodiment the actual control of the vehicle brakes is not affected by whose foot is operating the brake pedal. This is for safety reasons to ensure that the brakes are always operated. However it will be appreciated that in some circumstances it would be desirable for the vehicle to only respond to pedal inputs by the driver. For example if the pedal electrode 822 were placed in the accelerator pedal, the engine management system could be arranged to respond by increasing the output of the engine only if the foot operating the pedal were positively identified as being the driver's foot. In a similar manner an electrode can be associated with other driver inputs such as the gear shift lever or switch, or the controls for the electronic park braking, traction control, driving mode selection, vehicle starting, driving terrain selection, mirror adjustment and ride height control, and the associated functions of the vehicle only respond to the inputs if it is detected that the driver is operating them. This can provide a useful safety function, for example to ensure that children cannot interfere with the operation of the vehicle in an undesirable manner.

While all of the embodiments described above relate to differentiating between the driver and front passenger of a vehicle, it will be understood that the system of the invention could also be used to distinguish between any passengers. For example if there is an entertainment system with separate outputs, such as headphones, for each of the rear seat passengers, a single control input can be used by both passengers with the system controlling the output associated with whichever user is identified as operating the input.

Biometric sensors, which can identify an individual user by means of biometric parameters such as fingerprint or iris pattern, may be utilised in combination with the present invention to determine not only the identity of a user operating a user input, but the seat position within the vehicle of the user.

The invention claimed is:

1. A control system for a vehicle subsystem, the control system comprising:
   a controller arranged to control operation of the subsystem;
   a user input connected to the controller and arranged to be operated by a driver and a passenger of the vehicle to effect operation of the vehicle subsystem;
   a sensor comprising a transmitter and a receiver;
   wherein one of the transmitter and the receiver is associated with the user input and the other of the transmitter and the receiver is associated with at least one of the driver and the passenger;
   wherein upon detection by the receiver of a signal from the transmitter, the controller is arranged to distinguish between operation of the user input by the driver and operation of the user input by the passenger;
   wherein the control system includes a display for displaying information to the driver and the system being arranged such that:
      when the user input is operated by the driver, the display is operated so as to display said information to the driver; and
      when the user input is operated by the passenger, the display is not activated.

2. A system as claimed in claim 1, wherein the display comprises a head-up display arranged to project a display image onto a vehicle windscreen.

3. A system as claimed in claim 1, wherein when the user input is operated by the passenger, an illuminator is operated so as to display said information to the passenger.

4. A system as claimed in claim 1, wherein one of the transmitter and the receiver is in a position arranged to be associated with the driver.

5. A system as claimed in claim 4, wherein one of the transmitter and the receiver is a seat electrode mounted in a seat of the vehicle such that the driver is a person sitting on the seat.

6. A system as claimed in claim 4, wherein one of the transmitter and the receiver is arranged to be mounted in a footwell of the vehicle such that the driver is a person having their feet in the footwell.

7. A system as claimed in claim 1, wherein the user input comprises a movable input member and one of the transmitter and receiver is in communication with the input member.

8. A system as claimed in claim 7 wherein the input member is one of a hand operated input member and a foot operated pedal.

9. A system as claimed in claim 1, wherein one of the transmitter and receiver is mounted adjacent to the user input.

10. A system as claimed in claim 1, wherein the user input is provided in a panel and one of the transmitter and receiver is mounted around the panel.

11. A system as claimed in claim 1, wherein the user input includes a screen including a conductive layer which forms one of the transmitter and receiver.

12. A system as claimed in claim 1, wherein the receiver includes first and second receivers associated with the driver and the passenger respectively, and the controller is arranged to determine which of the driver of the passenger operates the user input based on the signal from the transmitter being received at one of the first and second receivers.

13. A control system for a vehicle subsystem, the control system comprising:
   a user input for operation by a driver and a passenger of the vehicle to effect operation of the vehicle subsystem;
   a sensor comprising a transmitter and a receiver to detect a signal from the receiver, wherein one of the transmitter and the receiver is associated with the user input and the other of the transmitter and the receiver is associated with at least one of the driver and the passenger;
   a head-up display arranged to project a display image onto a vehicle windscreen based on operation of the user input; and
   a controller in communication with the user input and the sensor, the controller configured to:

distinguish operation of the user input between the driver the passenger based on the sensor signal;

display the heads-up display image when the user input is operated by the driver; and prevent display of the heads-up image when the user input is operated by the passenger.

14. A system as claimed in claim 13, wherein the controller is further configured to:

illuminate an illuminator associated with the user input to display information to the passenger when the display of the heads-up image is prevented.

15. A system as claimed in claim 13, wherein one of the transmitter and the receiver is in a position arranged to be associated with the driver.

16. A system as claimed in claim 15, wherein one of the transmitter and the receiver is a seat electrode mounted in a seat of the vehicle such that the driver is a person sitting on the seat.

17. A system as claimed in claim 15, wherein one of the transmitter and the receiver is arranged to be mounted in a footwell of the vehicle such that the driver is a person having their feet in the footwell.

18. A system as claimed in claim 13, wherein the receiver includes first and second receivers associated with the driver and the passenger respectively, and the controller is configured to determine which of the driver of the passenger operates the user input based on the signal from the transmitter being received at one of the first and second receivers.

* * * * *